(12) United States Patent
Kim

(10) Patent No.: US 8,311,386 B2
(45) Date of Patent: Nov. 13, 2012

(54) CONTROL SIGNAL TRANSMITTING AND RECEIVING TECHNIQUES FOR VIDEO/AUDIO PROCESSING IC AND APPARATUS THEREFOR

(75) Inventor: Chul-min Kim, Suwon (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1664 days.

(21) Appl. No.: 11/657,607

(22) Filed: Jan. 25, 2007

(65) Prior Publication Data

US 2007/0121006 A1    May 31, 2007

Related U.S. Application Data

(63) Continuation of application No. 09/832,202, filed on Apr. 11, 2001, now Pat. No. 7,263,277.

(30) Foreign Application Priority Data

Oct. 31, 2000  (KR) ..................................... 00-64215

(51) Int. Cl.
*H04N 5/765* (2006.01)
(52) U.S. Cl. .................... 386/232; 386/233; 386/234
(58) Field of Classification Search .................. 386/232
See application file for complete search history.

(56) References Cited

U.S. PATENT DOCUMENTS

| | | | |
|---|---|---|---|
| 4,710,922 A * | 12/1987 | Scott | 370/535 |
| 4,958,344 A | 9/1990 | Scott | |
| 5,025,414 A | 6/1991 | Iwamoto | |
| 5,479,445 A * | 12/1995 | Kloker et al. | 375/220 |
| 5,832,119 A | 11/1998 | Rhoads | |
| 5,966,496 A * | 10/1999 | Takimoto | 386/95 |
| 5,974,055 A | 10/1999 | Imanishi | |
| 6,016,169 A * | 1/2000 | Mok | 348/724 |

* cited by examiner

*Primary Examiner* — Jamie Atala
(74) *Attorney, Agent, or Firm* — Stanzione & Kim, LLP

(57) ABSTRACT

Control signal transmitting and receiving methods for video/audio processing integrate circuit (IC), the method applied to a video player, and an apparatus therefor are provided. The control signal transmitting method, in a video player having an integrated circuit (IC) for processing video/audio signals and a microprocessor generating control signals to control the IC, has the steps of mapping serial data corresponding to possible control states of the video/audio signal processing IC, and storing the mapped data in a lookup table, reading serial data corresponding to a control state of the video/audio signal processing IC requested by the microprocessor, from the lookup table; and transmitting the serial data to the video/audio signal processing IC, being synchronized to a clock signal. Since in the control signal transmitting and receiving method the number of pins of an A/V IC decreases greatly compared to the conventional parallel transmitting and receiving method, the cost of manufacturing A/V ICs can be reduced to strengthen the competitiveness of products.

9 Claims, 6 Drawing Sheets

CONTROL SIGNAL TRANSMITTING AND RECEIVING TECHNIQUES FOR VIDEO/AUDIO PROCESSING IC AND APPARATUS THEREFOR

CROSS-REFERENCE TO RELATED APPLICATIONS

This application is a continuation application of Applicant's Ser. No. 09/832,202 filed in the U.S. Patent & Trademark Office on Apr. 11, 2001 now U.S. Pat. No. 7,263,277, and assigned to the assignee of the present invention.

CLAIM OF PRIORITY

This application makes reference to, incorporates the same herein, and claims all benefits accruing under 35 U.S.C. §119 from my application entitled Transmitting and Receiving Methods for Video/Audio Processing IC and Apparatus Therefor filed with the Korean Industrial Property Office on 31 Oct. 2000 and there duly assigned Ser. No. 2000/64215.

BACKGROUND OF THE INVENTION

1. Field of the Invention

The present invention relates to a video player, and more particularly, to control signal transmitting and receiving methods for video/audio processing integrated circuit (IC), the method applied to a video player, and an apparatus therefor.

2. Description of the Related Art

An audio/video processing IC (A/V IC) is an integrated circuit for processing video/audio signals in a video player. An A/V IC chip has many blocks, such as an FM modulator, an FM demodulator, a noise remover, a luminance/color matrix, a recording equalizer, a reproducing equalizer, a comb filter, and an automatic gain controller (AGC). This A/V IC controls the operations of embedded blocks according to an operation mode, such as recording, reproducing, or electronic-to-electronic (EE).

Signals for controlling the operations of the internal blocks of the A/V IC (hereinafter referred to as 'control signals') are provided by a microprocessor. The microprocessor outputs appropriate control signals according to the operation mode of the video player, to the A/V IC.

The conventional A/V IC receives control signals in parallel. For example, an LA71069M transmits and receives control signals using 7 pins. Transmitting needed control signals in parallel means that in order to input control signals, an IC should have input pins as many as the number of control signals. Considering the trend to strengthen competitiveness of each consumer electronic product, money is saved by reducing the number of circuit components. Therefore, it is inefficient to have many pins for inputting control signals.

SUMMARY OF THE INVENTION

To solve the above problems, it is an object of the present invention to provide improved control signal transmitting and receiving methods for efficiently transmitting and receiving control signals.

It is another object to provide an improved control signal transmitting and receiving apparatus for efficiently transmitting and receiving control signals.

It is also an object to provide a method and apparatus that reduces the number of pins and electrical lines leading to IC chips in a video player.

It is further an object to provide a method and apparatus for converting parallel control signals into serial control signals and vice versa in a video player.

It is further an object to encrypt and decrypt parallel control signals to serial control signals using lookup tables in a video player.

It is yet another object of the present invention to synchronize encrypted control signals with a clock signal in a video player.

It is still yet another object to provide a method and an apparatus for a video player wherein when a circuit block requesting a control signal is added inside the A/V IC chip or the states to be controlled increases, there is no need to adjust pins in the A/V IC chip, and therefore, design of the A/V IC chip can be easily changed.

To accomplish these and other objects of the present invention, there is provided a control signal transmitting method in a video player having an integrated circuit (IC) for processing video/audio signals and a microprocessor generating control signals to control the IC, the control signal transmitting method having the steps of mapping serial data corresponding to possible control states of the video/audio signal processing IC, and storing the mapped data in a lookup table, reading serial data corresponding to a control state of the video/audio signal processing IC requested by the microprocessor from the lookup table, and transmitting the serial data to the video/audio signal processing IC, being synchronized to a clock signal.

To accomplish other objects of the present invention, there is also provided a control signal receiving method in a video/audio processing IC, which is applied to a video player, internally has a plurality of blocks, and controls the operation of each block in response to a control signal applied from the outside, the control signal receiving method having the steps of mapping control signals corresponding to possible control states and storing the mapped control signals in a lookup table, receiving serial data corresponding to a control state requested by the video player, and generating control signals corresponding to the received serial data referring to the lookup table.

To accomplish other objects of the present invention, there is also provided a control signal transmitting apparatus in a video player having an IC for processing video/audio signals and a microprocessor generating control signals to control the IC, the control signal transmitting apparatus having a lookup table for storing mapped serial data corresponding to possible control states of the video/audio processing IC, a shift register reading serial data corresponding to the control states of the video/audio processing IC requested by the microprocessor, and outputting the data serially being synchronized to a clock signal.

To accomplish other objects of the present invention, there is also provided a video/audio processing IC, which is applied to a video player, internally has a plurality of blocks, and controls the operation of each block in response to a control signal applied from the outside, the video/audio processing IC having a latch for receiving serial data corresponding to a control state requested by the video player; and a decoder for having a lookup table, in which serial data corresponding to control signals corresponding to possible control states of the video/audio processing IC is mapped, and outputting control signals corresponding to serial data latched by the latch.

The present invention is characterized in that control signals are not transmitted in parallel, or on an inter-IC ($I^2C$) bus, but are transmitted serially. In the serial transmission, control signals are divided into three groups and then mapped respectively. The first group relates to basic operation modes and are always transmitted when a control signal is transmitted, while the second and third groups relate to detailed operation modes according to the basic operation modes, and are selectively transmitted.

The present invention provides substantial flexibility in transmitting and receiving control signals. For example, even when a circuit block requesting a control signal is added inside the A/V IC, or the states to be controlled increases, there is no need to adjust pins in the A/V IC, and therefore, design of the A/V IC can be easily changed. Also, since the number of pins of the A/V IC decreases greatly compared to the conventional parallel transmitting and receiving method, the manufacturing cost of the A/V IC is reduced, and as the result, the competitiveness of products can be strengthened.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
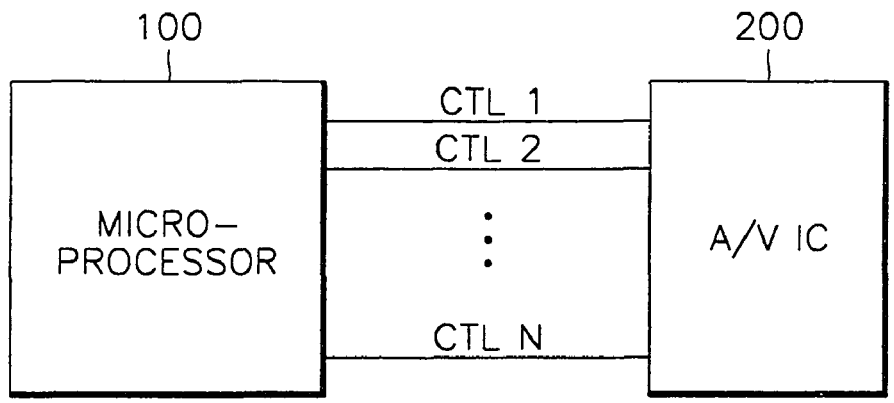
FIG. 1 is a conceptual diagram for showing a method for transmitting and receiving a control signal.

FIG. 1 is a conceptual diagram for showing a method for transmitting and receiving a control signal. The video player has basic operation modes, such as a recording mode, a reproducing mode, and an EE mode, and selective operations mode according to each basic operation mode. For example, the recording mode has selective operation modes such as standard play (SP), long play (LP), and extended play (EP). Also, the video player can controls a contour detail control value, a noise removal control value, the presence of compensation for drop-out, a recording/reproducing equalizer control value, a recording current control value, a synchronization slice level control value, the presence of the operation of a color comb filter when recording, etc.

The operation states of the A/V IC 200 according to the basic operation modes, selective operation modes, and control values, are determined by control signals provided by a microprocessor 100. The control signals correspond to possible control states respectively. Therefore, the microprocessor 100 and the A/V IC 200 should have output pins and input pins, respectively, corresponding to the number of control signals.

Figure 2:
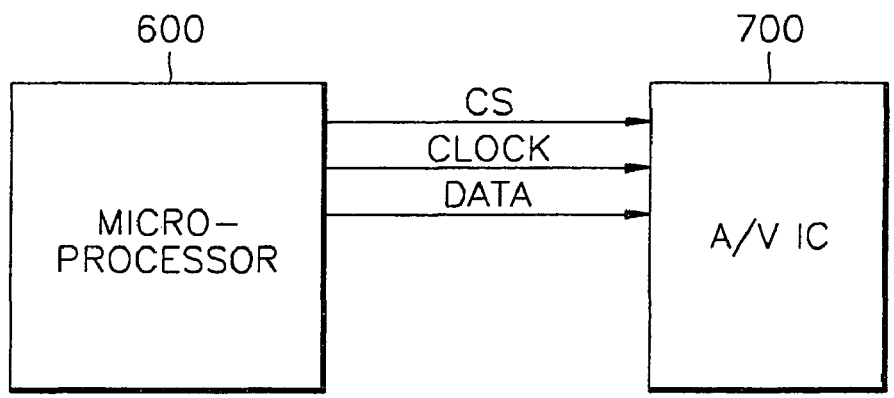
FIG. 2 is a conceptual diagram for showing a method for transmitting and receiving a control signal according to the present invention.

FIG. 2 is a conceptual diagram for showing a method for transmitting and receiving a control signal according to the present invention. As shown in FIG. 2, control signals are serially transmitted from the microprocessor 600 to the A/V IC 700. The microprocessor 600 groups possible control states, and transmits serial data having predetermined number of bits corresponding to each control state. Each of the microprocessor 600 and the A/V IC 700 has only three pins corresponding to a chip select signal (CS), a clock signal (clock), and data, regardless of the number of possible control states. Here, the possible control states are control states which the A/V IC 700 can have at a predetermined time. For example, there are control states which are determined by basic operation modes, selective operation modes, and control values.

Figure 3:
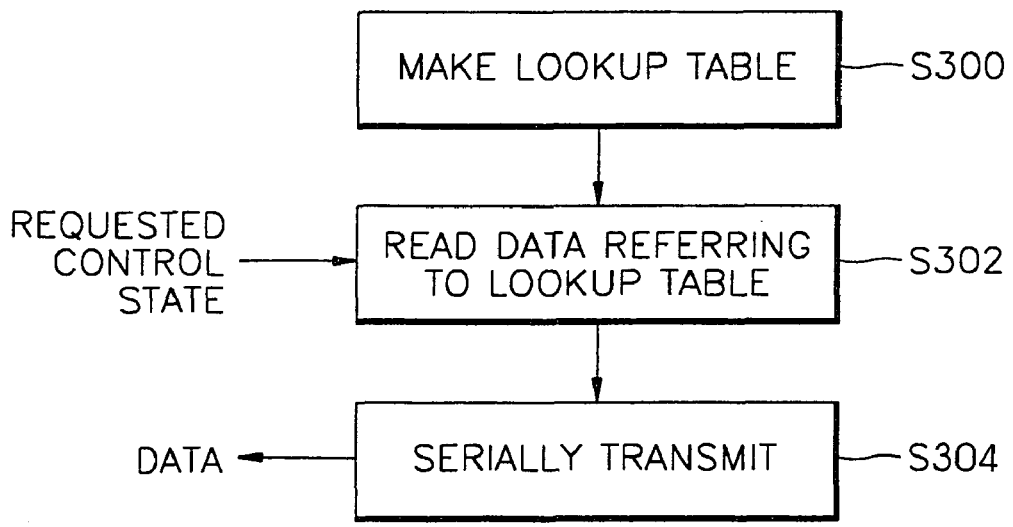
FIG. 3 is a flowchart for showing a method for transmitting a control signal according to the present invention.

FIG. 3 is a flowchart for showing a method for transmitting a control signal according to the present invention. In the control signal transmitting and receiving method according to the present invention, mapped control signals are first stored in a first lookup table in step S300. Here, mapping means to make a predetermined control signal correspond to serial data having a predetermined value, by matching the control signal with the serial data. The mapping method will be explained later referring to tables 1 through 3.

According to the request control state, a control signal mapped from the first lookup table is read in step S302. The mapped (or encrypted) control signal is data having a predetermined value corresponding to the requested control state. The mapped control signal is synchronized to a clock signal and transmitted serially in step S304. In this case, only three pins for data, a clock signal, and a chip select signal, can be assigned to each of the microprocessor 600 and the A/V IC 700. This shows that the number of needed pins is less than half the number of pins used in the method shown in FIG. 1.

Figure 4:
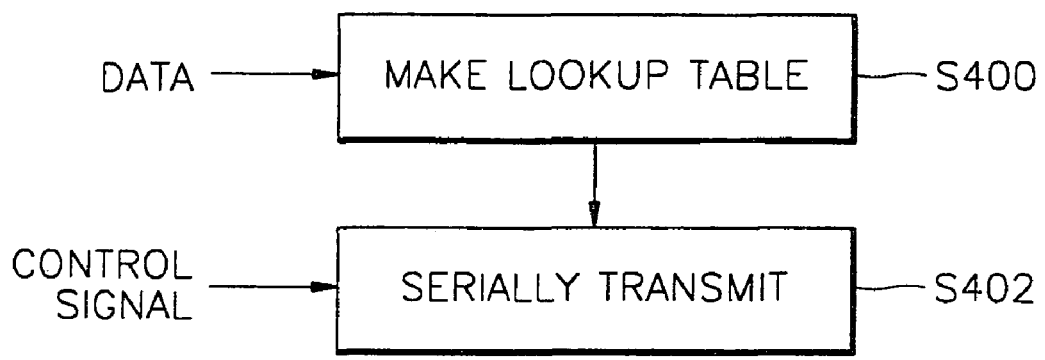
FIG. 4 is a flowchart for showing a method for receiving a control signal according to the present invention.

FIG. 4 is a flowchart for showing a method for receiving a control signal according to the present invention. First, the mapped control signal transmitted in the step S304 of FIG. 3, and clock signal are received in step S400. The mapped control signal is synchronized to the clock signal and detected. A second lookup table outputs a decrypted control signal which corresponds to an address, using the mapped control signal as the address, in step S402. Control signals are provided to the internal blocks of the A/V IC 700 to control the operations of the blocks.

Tables 1 through 3 show the contents to be stored in the lookup table in the step S300. The lookup table is formed of three groups, each group being represented by 1 byte. Each group includes 4 to 8 subgroups, each subgroup having two bits or one bit. The first group includes control states related to the basic operation modes of the video player, the second group includes controls states related to the detailed operation modes according to the basic operation modes, and the third group includes control states related to control values.

TABLE 1

| Group | Bit address | | | | | | | | Control state |
|---|---|---|---|---|---|---|---|---|---|
| address | 8 | 7 | 6 | 5 | 4 | 3 | 2 | 1 | |
| Group 1 | | | | | | | 0 | 0 | VIDEO REC |
| | | | | | | | 0 | 1 | VIDEO PB |
| | | | | | | | 1 | 0 | VIDEO EE |

TABLE 1-continued

| Group address | \multicolumn{8}{c}{Bit address} | Control state |
|---|---|---|---|---|---|---|---|---|---|
| | 8 | 7 | 6 | 5 | 4 | 3 | 2 | 1 | |
| | | | | | | | 1 | 1 | PROHIBIT |
| | | | | | 0 | 0 | | | AUDIO REC |
| | | | | | 0 | 1 | | | AUDIO PB |
| | | | | | 1 | 0 | | | AUDIO EE |
| | | | | | 1 | 1 | | | PROHIBIT(Y-TEST MODE) |
| | | | 0 | 0 | | | | | HA REC |
| | | | 0 | 1 | | | | | HA PB |
| | | | 1 | 0 | | | | | HA REC PAUSE |
| | | | 1 | 1 | | | | | PROHIBIT(F-TEST MODE) |
| | 0 | 0 | | | | | | | (VIDEO/AUDIO) SW INPUT1 |
| | 0 | 1 | | | | | | | (VIDEO/AUDIO) SW INPUT2 |
| | 1 | 0 | | | | | | | (VIDEO/AUDIO) SW INPUT3 |
| | 1 | 1 | | | | | | | PROHIBIT |

In the first group shown in table 1, the first bit and second bit indicate video operation modes. That is, if both the first bit and the second bit are "0", it indicates "video recording mode" is indicated; if the first bit and the second bit are "1" and "0" respectively, it indicates "video reproducing mode"; and if the first bit and the second bit are "0" and "1" respectively, it indicates "video EE mode". Likewise, the third bit and the fourth bit indicate audio operation modes, the fifth bit and the sixth bit indicate head amp operation modes, and the seventh bit and the eighth bit indicate input modes.

TABLE 2

| Group address | \multicolumn{8}{c}{Bit address} | Control state |
|---|---|---|---|---|---|---|---|---|---|
| | 8 | 7 | 6 | 5 | 4 | 3 | 2 | 1 | |
| Group 2 | | | | | | | 0 | 0 | (VIDEO/AUDIO) SP |
| | | | | | | | 0 | 1 | (VIDEO/AUDIO) LP |
| | | | | | | | 1 | 0 | (VIDEO/AUDIO) 3P |
| | | | | | | | 1 | 1 | CARRIER SHIFT ON * SP |
| | | | | | 0 | 0 | | | DETAIL WEAK/NC1 WEAK |
| | | | | | 0 | 1 | | | DETAIL MEDIUM/NC1 MEDIUM |
| | | | | | 1 | 0 | | | DETAIL STRONG/NC1 STRONG |
| | | | | | 1 | 1 | | | PROHIBIT |
| | | | 0 | 0 | | | | | YNR OFF |
| | | | 0 | 1 | | | | | YNR WEAK |
| | | | 1 | 0 | | | | | YNR MEDIUM |
| | | | 1 | 1 | | | | | YNR STRONG |
| | | 0 | | | | | | | AUTO(VXO/XO)/DOC AUTO |
| | | 1 | | | | | | | FORCED XO/DOC OFF |
| | 0 | | | | | | | | CG NORMAL/NORMAL PB |
| | 1 | | | | | | | | CD STOP/TRICK PB |

As shown in table 2, in the second group, the first bit and the second bit indicate a tape recording time in the recording mode; the third bit and the fourth bit indicate the degree of detail; the fifth bit and the sixth bit indicate the degree of processing luminance signal noise; the seventh bit indicates an omission processing mode; and the eighth bit indicates normal/trick reproducing mode.

TABLE 3

| Group address | \multicolumn{8}{c}{Bit address} | Control state |
|---|---|---|---|---|---|---|---|---|---|
| | 8 | 7 | 6 | 5 | 4 | 3 | 2 | 1 | |
| Group 3 | | | | | | | 0 | 0 | Y/C MIX RATIO Y-RM: +1 Db/PB-EQ LOW-SIDE BAND: 1(low) |
| | | | | | | | 0 | 1 | Y/C MIX RATIO Y-RM: 0 Db/PB-EQ LOW-SIDE BAND: 1 |
| | | | | | | | 1 | 0 | Y/C MIX RATIO Y-RM: −1 Db/PB-EQ LOW-SIDE BAND: 1 |
| | | | | | | | 1 | 1 | Y/C MIX RATIO Y-RM: −2 Db/PB-EQ LOW-SIDE BAND: 1(high) |
| | | | | | | 0 | | | REC CURRENT: 0 db/ENV DET SENSITIVITY: low |
| | | | | | | 1 | | | REC CURRENT: +2 db/ENV DET SENSITIVITY: high |
| | | | | | 0 | | | | REC EQ SLOPE: Gentle/PB-EQ HIGH-TRAP: 7.5 MHz |
| | | | | | 1 | | | | REC EQ SLOPE: Steep/PB-EQ HIGH-TRAP: 8.5 MHz |
| | | | | 0 | | | | | Chroma DET OFF |
| | | | | 1 | | | | | Chroma DET ON |
| | | | 1 | | | | | | SYNC SLICE LEVEL = SYNC TIP SIDE |
| | | | 0 | | | | | | SYNC SLICE LEVEL = PEDESTAL SIDE |
| | | 0 | | | | | | | REC C-COMB ON |
| | | 1 | | | | | | | REC C-COMB OFF |
| | 1 | | | | | | | | SIGNAL |
| | 0 | | | | | | | | NO-SIGNAL |

As shown in table 3, in the third group, the first bit and the second bit indicate the mix ratio of luminance/chromaticity signals in the recording mode, and the equalizing degree in the reproducing mode. The third bit indicates the degree of a recording current and the sensitivity adjusting value of the recording equalizer in the recording mode. The fourth bit indicates the slope of the equalizer in recording, and indicates the trap value of the reproducing equalizer in the reproducing mode. The fifth bit indicates ON/OFF of chromaticity signal detail, and the sixth bit indicates a sync slice level. The seventh bit indicates ON/OFF of the chroma comb filter in recording, and the eighth bit indicates the presence of a video signal.

The reason for grouping control states into the first group through the third group is that serial transmission is done only at a time when control is needed, inlike parallel transmission. That is, in parallel transmission, latches for latching control signals are equipped so that control signal can always be referred to by the A/V IC, while in serial transmission, a control signal is transmitted at a predetermined time (a time when control is needed, or an interval where a chip select signal is enabled) and the A/V IC 700 cannot always refer to control signals. Therefore, whenever a control signal is transmitted, the A/V IC 700 need be informed of the basic operation mode. Because of this, control signals are grouped so that control signals related to the basic operation modes are necessarily transmitted and control signals related to the selective operation modes and control values are additionally transmitted.

Figure 5:
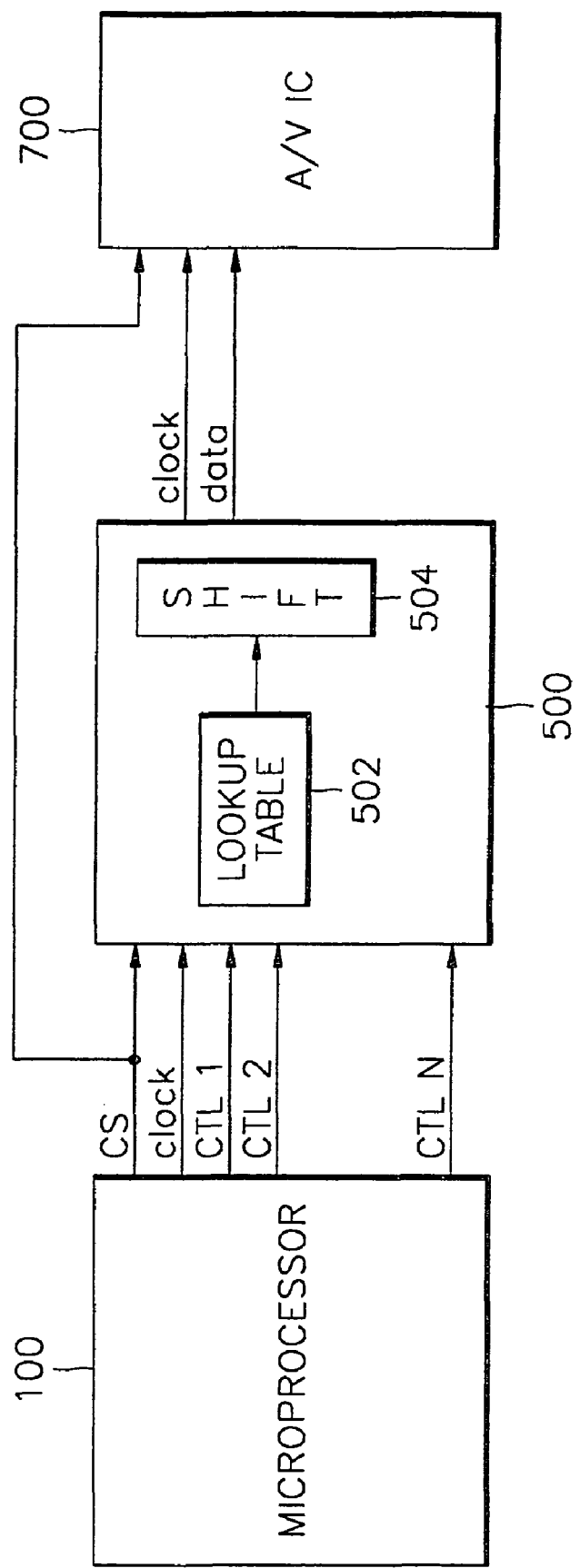
FIG. 5 is a block diagram illustrating the apparatus according to a first embodiment of the present invention.

FIG. 5 is a block diagram for showing the structure of the first embodiment of an apparatus according to the present invention. The apparatus shown in FIG. 5 corresponds to a case in which an A/V IC uses a serial transmission method and a microprocessor uses a parallel transmission method. The apparatus shown in FIG. 5 has a parallel/serial conversion apparatus (P/S converter) 500 separate from a microprocessor 100. The P/S converter 500 has a lookup table 502, and a shift register 504. The microprocessor 100 outputs control signals CTL1-CTLn determined according to a mode selected by a user and the state of an input A/V signal, etc. The lookup table 502 outputs mapped control signals shown in tables 1 through 3, using parallel control signals provided from the microprocessor 100 as address signals. The mapped (or encrypted) control signals output from the lookup table 502 are 1 to 3 bytes long, and stored in the shift register 504. The mapped control signals stored in the shift register 504 are synchronized to the clock signal (clk) and transmitted to the A/V IC 700 in units of one bit. The P/S converter 500 operates during the active interval of the chip enable signal (CS).

Figure 6:
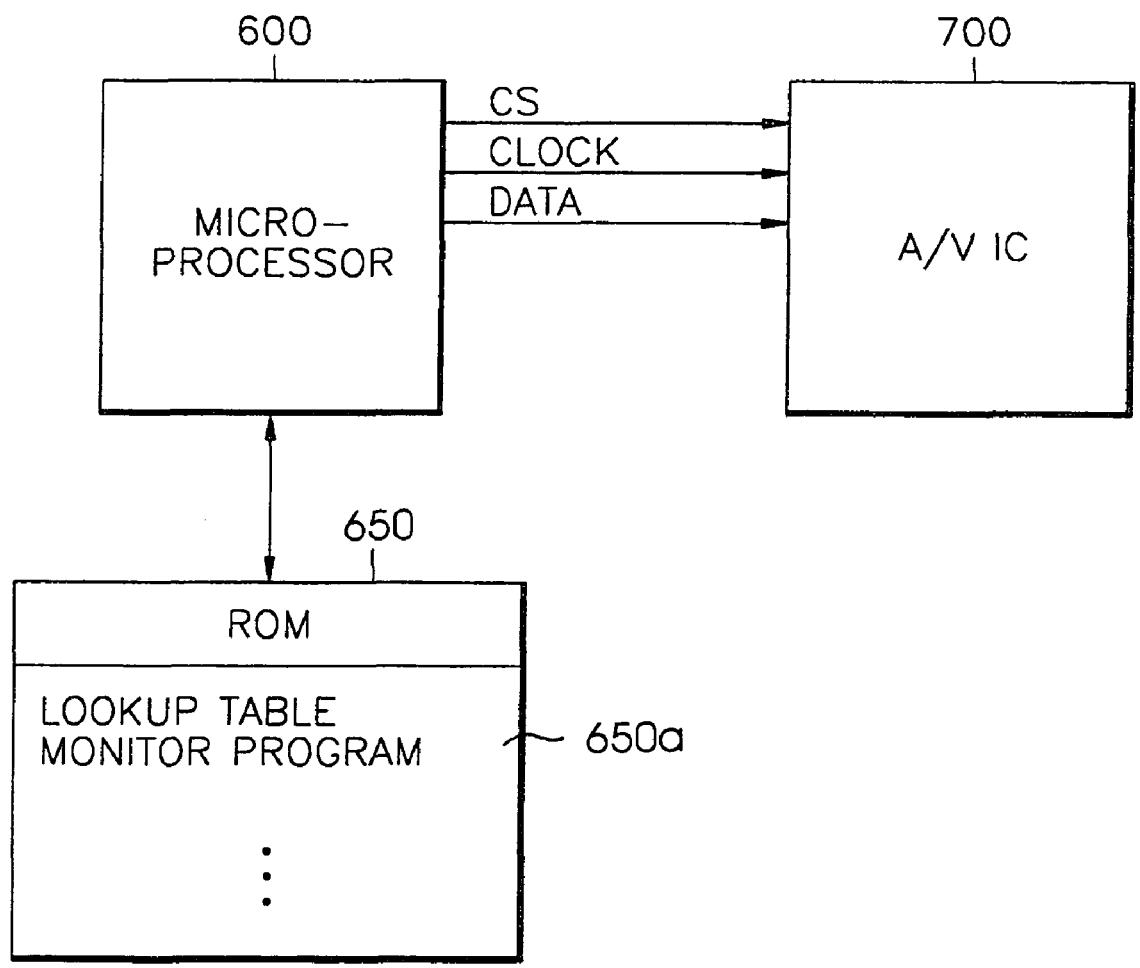
FIG. 6 is a block diagram illustrating apparatus according to a second embodiment of the present invention.

FIG. 6 is a block diagram for illustrating a second embodiment of a control signal transmitting apparatus according to the present invention. The apparatus shown in FIG. 6 corresponds to a case where a microprocessor 600 directly outputs mapped (or encrypted) control signals, and has a lookup table 650a implemented in software. This lookup table 650a is included in a program for controlling the microprocessor 600 and generally stored in a ROM 650. The microprocessor 600 obtains mapped control signals corresponding control states, from the lookup table 650a. The mapped control signals together with a clock signal (CLK) and a chip enable signal (CS) are transmitted to the A/V IC 700.

Figure 7:
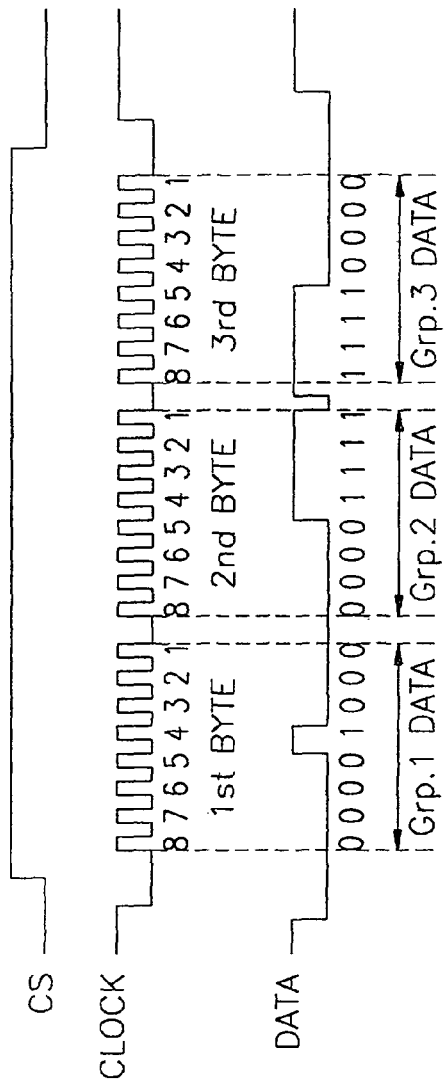
FIG. 7 illustrates the format of data transmitted in a method for transmitting a control signal according to both embodiments of the present invention.

FIG. 7 illustrates the format of data transmitted in a method for transmitting a control signal according to both embodiments of the present invention. A chip select signal (CS) is shown at the top of FIG. 7, a clock signal is shown at the center of FIG. 7, and data, that is a mapped control signal, is shown at the bottom of FIG. 7. Data is formed of 1 to 3 bytes, each of which corresponds to either of the first group through the third group. Among the groups, the first byte (group 1) is always transmitted, while the second byte and the third byte (group 2 and group 3) are selectively transmitted when necessary. When a control signal is wanted to be transmitted, the chip select signal (CS) is first activated to let the A/V IC 700 know that data will be transmitted. In FIG. 7, the chip select signal (CS) is active high. Then, data is transmitted being synchronized to the clock signal. When data transmission is completed, the microprocessor 100 or 600 makes the chip select signal deactivated so that the A/V IC 700 is informed that data transmission is completed. When the chip select signal (CS) is deactivated, the A/V IC knows that data transmission is completed. Then, the A/V IC 700 decrypts the transmitted data and controls the operations of internal blocks.

Figure 8:
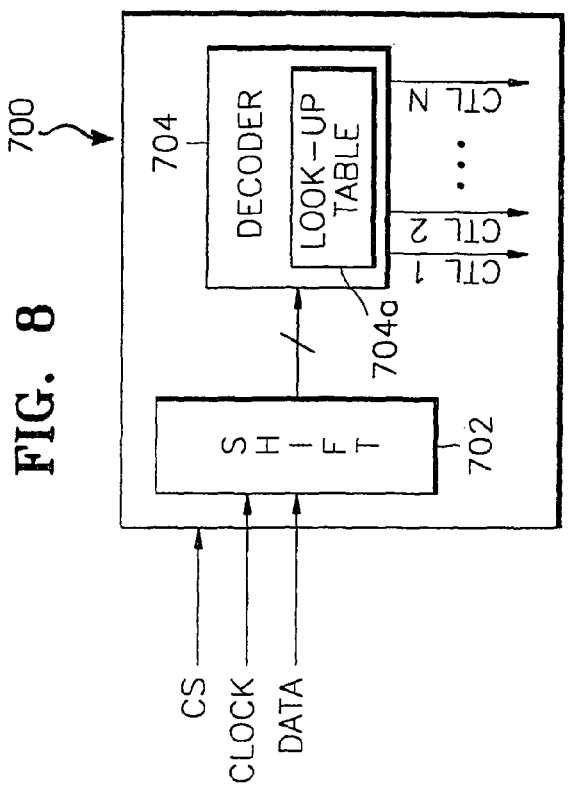
FIG. 8 is a block diagram for showing the structure of an audio/video integrated circuit (A/V IC) according to both embodiments of the present invention.

FIG. 8 is a block diagram for showing the structure of an audio/video integrated circuit (A/V IC) according to both embodiments of the present invention. The A/V IC shown in FIG. 8 has a shift register 702 and a decoder 704. When the chip select signal (CS) is activated, the shift register 702 receives data, which is serially transmitted being synchronized to the clock signal, and converts the data into parallel data. The shift register 702 provides receiving data to the decoder 704. The decoder 704 decodes receiving data into control signals for controlling the internal blocks of the A/V IC 700 with look-up table 704a. The decoded control signals are provided to the internal blocks of the A/V IC 700 to control the operations of the blocks.

Figure 9:
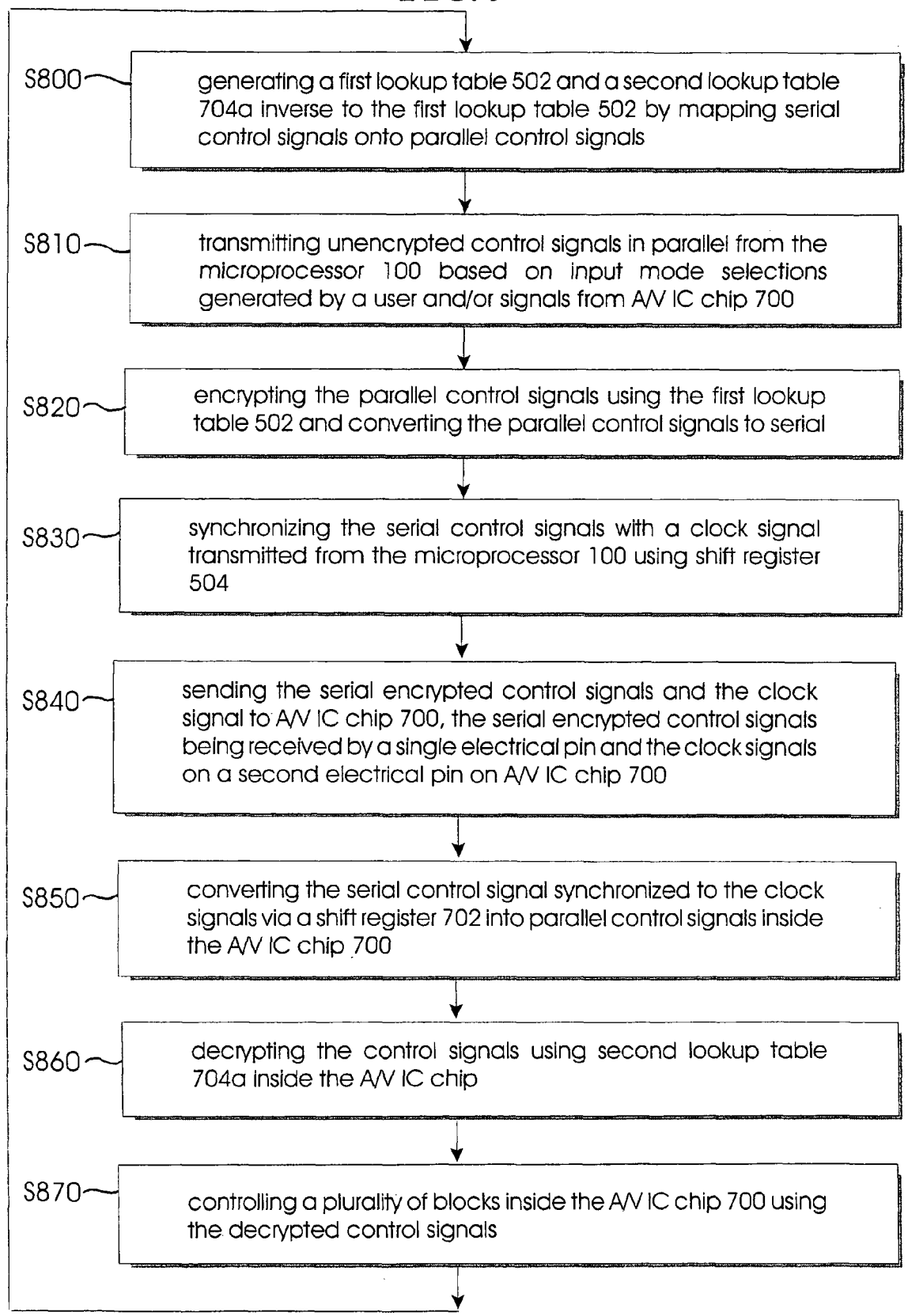
FIG. 9 illustrates a flow chart pertaining to the first embodiment of the present invention using the apparatus illustrated in FIGS. 5 and 8.

Turning to FIG. 9, FIG. 9 is a flow chart for the first embodiment of this invention using the apparatus illustrated in FIGS. 5 and 8. The first step, step S800, pertains to the generation of both lookup tables 502 and 704a. These two lookup tables are inverses of each other as lookup table 502 is used to encrypt control signals and lookup table 704a is used to decrypt encrypted control signals used to control the blocks of A/V IC chip 700. Step S810 pertains to transmitting unencrypted control signals in parallel from microprocessor 100 to parallel to serial converter chip 500. These control signals are based on mode input by a user to the video player and/or signals received by microprocessor 100 from A/V IC chip 700. Once these parallel unencrypted control signals are inside parallel to serial converter 500, step S820 encrypts these control signals using lookup table 502. The encrypted control signals are transmitted using a single electrical pin from parallel to serial converter chip 500 to A/V IC chip 700 (S840) after converting the parallel control signals into a serial form and synchronizing the serial control signals to a clock signal transmitted from microprocessor 100 to A/V IC chip 700 (S840) using shift register 504 inside parallel to serial converter chip 500 in step S830. Thus, the control signals are received by A/V IC chip by a single electrical pin and the clock signals are received by a second electrical pin of A/V IC chip 700. Once the encrypted serial control signals are received via one electrical pin of A/V IC chip 700, the control signals are converted to a plurality of parallel control signals by shift register 702 inside A/V IC chip 700 (S850). Then the control signals inside A/V IC chip 700 are decrypted using lookup table 704a inside decoder 704 inside A/V IC chip 700 (S860). Finally, these decrypted control signals in parallel can be used to control various blocks within A/V IC chip 700 (S870).

Figure 10:
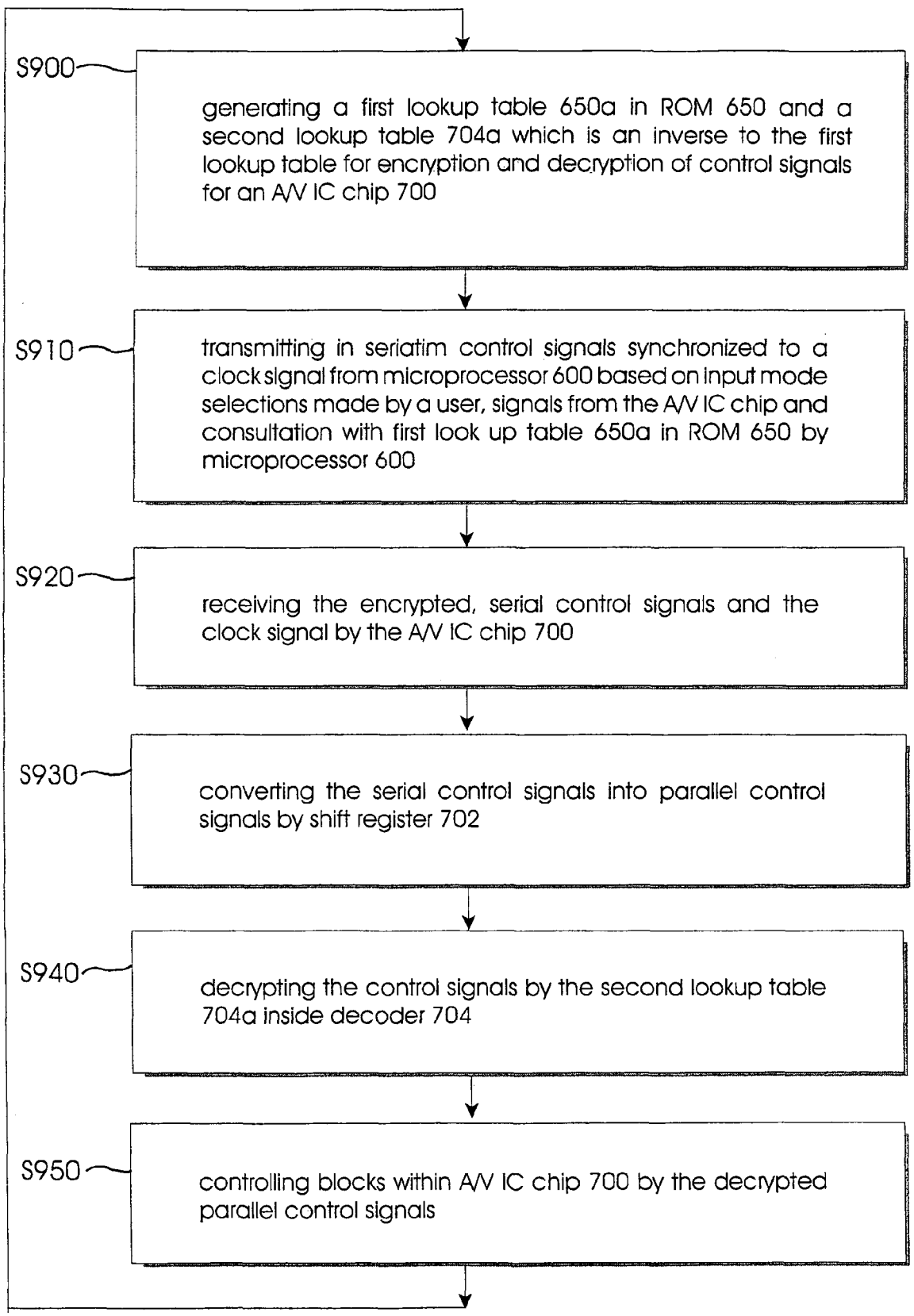
FIG. 10 illustrates a flow chart pertaining to the first embodiment of the present invention using the apparatus illustrated in FIGS. 6 and 8.

Turning to FIG. 10, FIG. 10 is a flow chart for the second embodiment of this invention using the apparatus illustrated in FIGS. 6 and 8. The first step, step S900, pertains to the generation of both lookup tables 650a and 704a. These two lookup tables are inverses of each other as lookup table 650a is used to encrypt control signals and lookup table 704a is used to decrypt encrypted control signals used to control the blocks of A/V IC chip 700. Unlike the first embodiment, microprocessor 600 in the second embodiment transmits encrypted control signals in seriatim from a single electrical pin to A/V IC chip 700 and microprocessor 600 transmits a clock signal synchronized to the encrypted serial control signals over another electrical line to A/V IC chip 700 (S910). The encrypted serial control signals transmitted from microprocessor 600 are based on mode selections input by a user, signals received by microprocessor 600 from A/V IC chip 700 and consultation by microprocessor 600 with lookup table 650a in ROM 650. The encrypted serial control signals are received by a first electrical pin of A/V IC chip 700 and the clock signal is received by a second electrical pin of A/V IC chip 700 (S920). Once the encrypted serial control signals are received via the first electrical pin of A/V IC chip 700, the control signals are converted to a plurality of parallel control signals by shift register 702 inside A/V IC chip 700 (S930). Then the control signals inside A/V IC chip 700 are decrypted using lookup table 704a inside decoder 704 inside A/V IC chip 700 (S940). Finally, these decrypted control signals in parallel can be used to control various blocks within A/V IC chip 700 (S950).

As described above, since the control signal transmitting and receiving method according to the present invention needs only three terminals of chip select signals (CS), data, and clock signals for transmitting control signals, the number of pins of an A/V IC decreases greatly compared to the conventional parallel transmitting and receiving method, and therefore the cost of manufacturing A/V ICs can be reduced to strengthen the competitiveness of products. Also, since pins of the A/V IC need not be adjusted even when a circuit block requiring control signals is added inside the A/V IC, or control states increase, design of the A/V IC can be easily changed.

It should be understood that the present invention is not limited to the particular embodiments disclosed herein as the best mode contemplated for carrying out the present invention, but rather that the present invention is not limited to the specific embodiments described in this specification except as defined in the appended claims.

What is claimed is:

1. A control signal transmitting method in a video player, comprising: transmitting a chip select signal (CS) from a microprocessor to a video/audio integrated circuit (IC); and transmitting, from the microprocessor, a plurality of serial control signals adapted to control the video/audio IC during an interval when the chip select signal (CS) is being transmitted, the serial control signals being synchronized to a clock signal.

2. The control signal transmitting method of claim 1, wherein the chip select signal (CS) indicates a start and an end of the transmitting of the plurality of serial control signals.

3. The control signal transmitting method of claim 1, wherein the plurality of serial control signals to be transmitted are grouped into a first group having control states corresponding to operation modes of the video player, and other groups having control states corresponding to selective operation modes attached to the operation modes.

4. The control signal transmitting method of claim 3, wherein serial control signals of each group represent control states corresponding to parallel control signals.

5. The control signal transmitting method of claim 4, wherein the parallel control signals are used as a bit address of a lookup table.

6. The control signal transmitting method of claim 3, wherein the first group comprises control states corresponding to video operation modes, audio operation modes, head amp operation modes, and input modes.

7. The control signal transmitting method of claim 6, wherein a second group comprises control states corresponding to a tape recording time, the degree of detail, the degree of processing luminance signal noise, an omission processing mode, and a normal/trick reproducing mode.

8. The control signal transmitting method of claim 6, wherein a third group comprises control states corresponding to the mix ratio of luminance/chromaticity signals in recording mode, equalizing degree in the reproducing mode, degree of a recording current and the sensitivity adjusting value of the recording equalizer in the recording mode, slope of the equalizer in recording, the trap value of the reproducing equalizer in the reproducing mode, ON/OFF of chromaticity signal detail, sync slice level, ON/OFF of the chroma comb filter in recording, and presence of a video signal.

9. The control signal transmitting method of claim 1, the video player being an appliance selected from the group consisting of a DVD (Digital Versatile Disc) player, a DVD recorder, a DVD player/VCR (Video Cassette Recorder) Combo, and a DVD recorder/VCR Combo.

* * * * *